United States Patent [19]
Cates

[11] Patent Number: 5,855,056
[45] Date of Patent: Jan. 5, 1999

[54] METHOD FOR FABRICATING MAGNETIC HEADS HAVING VARYING GAP LENGTHS ON A COMMON WAFER

[75] Inventor: James C. Cates, Louisville, Colo.

[73] Assignee: Storage Technology Corporation, Louisville, Colo.

[21] Appl. No.: 975,223

[22] Filed: Nov. 20, 1997

[51] Int. Cl.[6] ....................................................... G11B 5/42
[52] U.S. Cl. ........................................ 29/603.14; 360/121
[58] Field of Search ............................. 29/603.11, 603.13, 29/603.14, 603.15; 427/130, 131; 360/119, 121, 126

[56] References Cited

U.S. PATENT DOCUMENTS

| | | | |
|---|---|---|---|
| 3,668,669 | 6/1972 | Marino et al. | 340/174.1 F |
| 4,742,412 | 5/1988 | Kuriyama | 360/119 |
| 5,041,936 | 8/1991 | Hayakawa | 360/121 |

Primary Examiner—Carl E. Hall
Assistant Examiner—Davide Caputo
Attorney, Agent, or Firm—Brooks & Kushman P.C.

[57] ABSTRACT

An improved method for forming a magnetic head which efficiently allows multiple head elements of varying gap length to be located on a common wafer. A multiple gap magnetic head is formed by depositing a first magnetic layer on a wafer such that the first layer extends across all the head element segments Two separate insulating layers are individually deposited over the first layer, with a thin etch stop barrier layer being deposited between the insulation layers over heads which are to have a narrower gap length. The top insulation layer covering the etch stop barrier layer is then removed, and a second magnetic layer deposited over all the head element segments on the wafer. In addition to simplifying the fabrication process, the etch stop layer allows tight processing control to be maintained when creating the different gap lengths.

4 Claims, 2 Drawing Sheets

METHOD FOR FABRICATING MAGNETIC HEADS HAVING VARYING GAP LENGTHS ON A COMMON WAFER

TECHNICAL FIELD

The present invention generally relates to the field of magnetic read and write heads and, more particularly, to an improved wafer processing technique for a magnetic head having different types of inductive read and write elements on a common wafer.

BACKGROUND ART

A magnetic head, such as a multiple module servo writer, utilizes multiple read/write elements which are integrated into the same gap line using conventional wafer manufacturing techniques. Generally, a magnetic read or write element is formed from several different material layers that perform particular functions for the individual read and write elements. In particular, a first thick magnetic layer operates as a first pole layer, and a second thick magnetic layer operates as a second pole layer. An insulator layer is included so as to provide electrical and magnetic insulation between the pole layers. The thickness of the insulator layer between the first and second pole layers defines the read and write gap length.

With respect to a servo writer, it may be desirable to optimize or adjust the gap length for a particular head element based on its function, e.g., one may prefer to utilize a predetermined gap length for timing pattern inductive read/write elements and a different predetermined gap length for servo write elements on each of the modules that make up a servo writer. However, known methods of wafer manufacturing for such a magnetic head have required separate depositions of the second thick magnetic pole layer for the elements with different gap lengths, adding substantially to the time required for processing. Thus, conventional wafer techniques would greatly increase the processing complexity if used to create multiple gap lengths on the same wafer, thereby resulting in decreased yield and increased cost of each head. In addition, modules that have a uniform gap length can be combined with other modules of a differing gap length on the same wafer, which in turn provides significant savings in mask costs and decreases the number of wafers that require processing.

DISCLOSURE OF THE INVENTION

It is therefore an object of the present invention to provide a method for fabricating a magnetic head which efficiently provides different types of read or write elements having varying gap lengths to be located on a common wafer.

It is another object of the present invention to provide a method for fabricating a magnetic head which can selectively provide varying gap lengths for different read or write elements located on a common wafer without significantly increasing processing complexity or decreasing yield.

In accordance with these and other objects, the present invention provides an improved method for fabricating a magnetic head having a plurality of head elements located on a common wafer which method allows individual elements to have a selectively varying gap length from other elements on the same wafer. The method provides for depositing a first magnetic layer to form a bottom pole, and two separately deposited insulating gap layers covering the first magnetic layer. A barrier layer is selectively sandwiched between the two insulating gap layers over individual head elements which are to have a narrower gap length. The top insulating layer is subsequently removed over the narrower gap head elements until the barrier layer is reached. A second magnetic layer is then deposited over all head elements to form a top pole.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
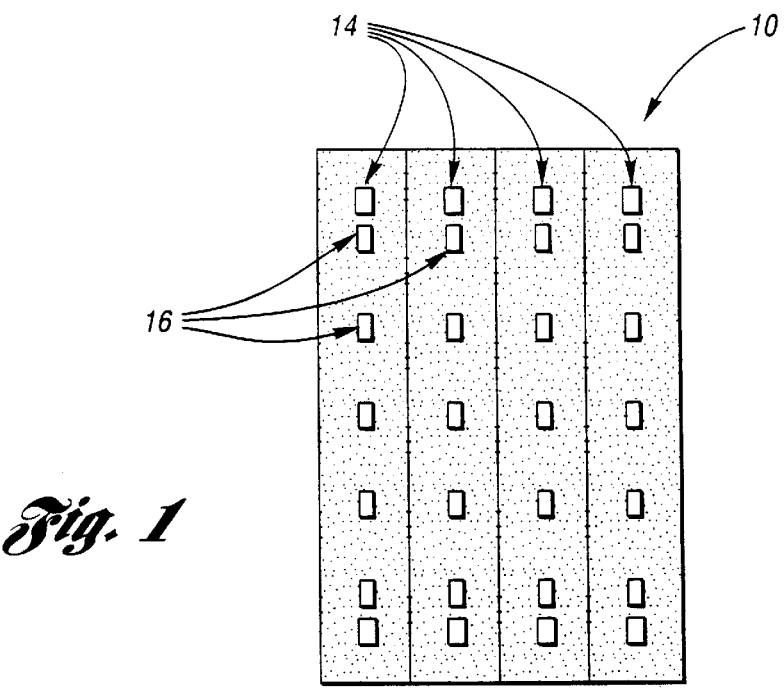
FIG. 1 shows a magnetic head having multiple gap lengths as viewed from the perspective of a magnetic storage medium.

Referring to FIG. 1, a magnetic head 10 is shown as having a plurality of write head elements and read elements located on a common planar wafer 12. In the example shown in FIG. 1, head 10 is arranged as a four module servo writer head having multiple read and write head elements of varying type placed in the same gap line. More specifically, as is understood in the art, some head elements operate as a timing pattern write element or read element 14 and some heads operate as a servo write element 16. A magnetic storage media is moved past the head 10 as indicated by arrow 17. While a four module servo writer head is shown, such an arrangement is not to be construed as limiting when the present application is used in fabricating a servo write head. In general, the present invention can be advantageously used to fabricate a servo write head having only one timing pattern read element, one timing pattern write element, and one servo write element.

Figure 2:
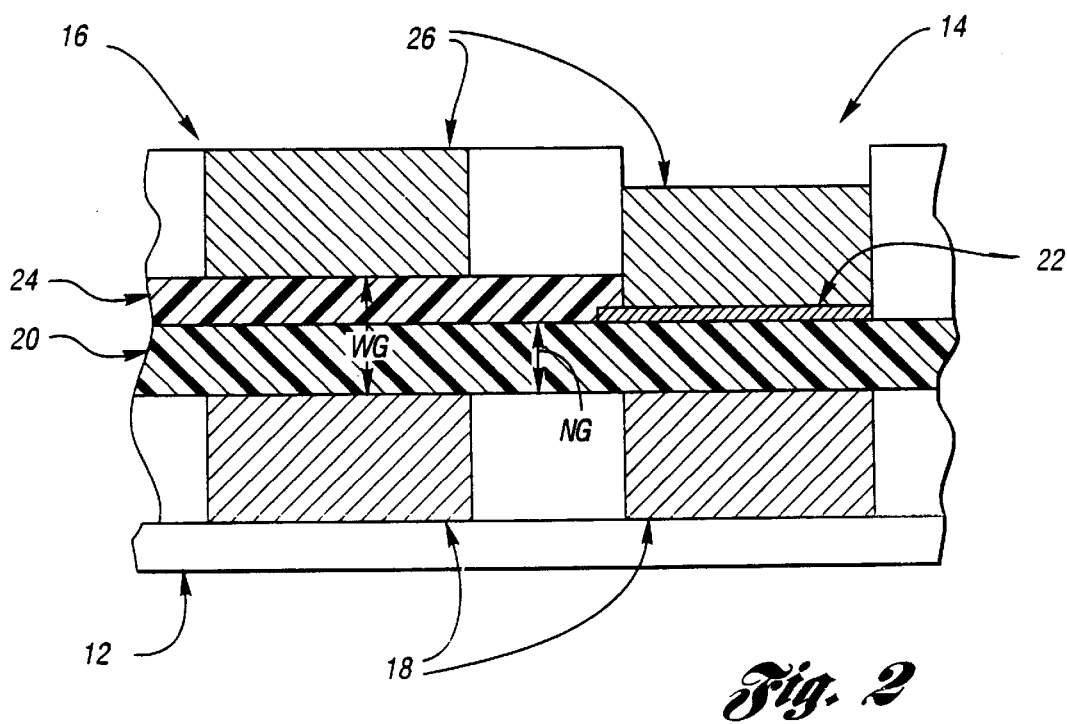
FIG. 2 is a detailed cross-section of a portion of the head of FIG. 1.
Figure 3:
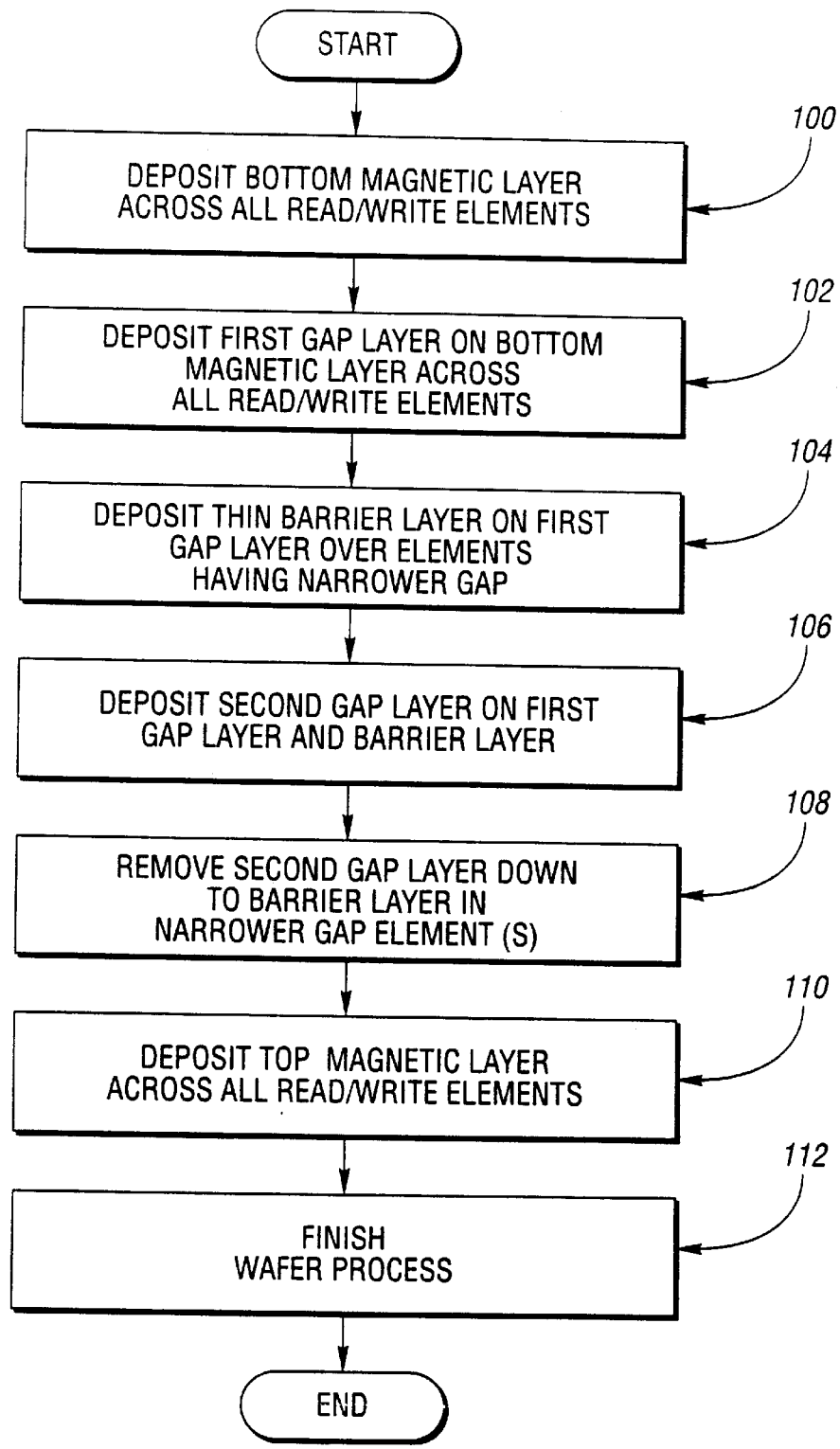
FIG. 3 is a flow chart showing the process for fabricating the multiple gap length head of FIG. 1 in accordance with the present invention.

As described more fully below, the present invention provides a method for fabricating multiple head elements on a common wafer which easily and efficiently allows each head element to have a different gap length optimized based on the particular function of the head element. Description of the fabrication process will be made in connection with FIGS. 2 and 3. With respect to FIG. 2, it is noted that the illustrated dimensions have been exaggerated for ease of illustration.

A wafer substrate 12 is prepared in accordance with conventional practices. Such preparation could include depositing a spacer layer (not shown) on the wafer. At block 100, a first thick layer 18 of magnetic material of high permeability is deposited, such as by an electroplating or sputtering process, on top of the wafer so as to extend across all head elements on the wafer. Layer 18 functions as a bottom pole for the head elements, and can have a thickness of several micrometers. Layer 18 can be subsequently patterned in accordance with known practice by using a conventional chemical etching or milling process.

At block 102, a first thin insulating gap layer 20 formed from material that provides suitable electrical and magnetic insulation is deposited on top of layer 18 across all head elements on the wafer. At block 104, a thin barrier layer 22 is selectively deposited over layer 20 across those individual head elements, for example head element 14, which are to have a narrower gap length NG. Barrier layer 22 can be deposited by sputtering, and patterned using a photoresist.

At block 106, a second insulating gap layer 24 is deposited on top of layers 20 and 22 covering all head elements. The combined thickness of gap layers 20 and 24 provide the desired wider gap length WG. The second gap layer 24 is then patterned and removed from the narrower gap element (s), as denoted at block 108.

In accordance with the preferred embodiment, barrier layer 22 is formed from a magnetic material, such as Permalloy (NiFe), and functions as an etch stop or protective barrier to inhibit removal of gap layer 20 when removing gap layer 24. This in turn ensures precise accuracy in the thickness of the narrower gap length NG.

At block 110, a top layer 26 of magnetic material is deposited and patterned on top of layers 22 and 24 covering all head elements on the wafer. Layer 26 is formed in a manner similar to bottom layer 18, and provides a top pole for the head elements. As denoted at block 112, the wafer is then finished in accordance with conventional wafer manufacturing processes.

Thus, the present invention provides a method of fabricating head elements of selectively different gap lengths on a common wafer which minimizes any potential increase in complexity to the wafer processing, thereby increasing yield and head cost over prior arrangements.

While the best mode for carrying out the invention has been described in detail, those familiar with the art to which this invention relates will recognize various alternative designs and embodiments for practicing the invention as defined by the following claims.

What is claimed is:

1. A method for fabricating magnetic head structures having a plurality of head elements positioned on a common wafer, said method comprising:
   depositing a first layer of magnetic material to extend across all of said plurality of head elements and patterning to form a plurality of bottom poles;
   depositing a first gap layer of insulating material having a predetermined thickness on top of said first layer;
   selectively depositing a barrier layer on top of said first insulating gap layer across at least one but not all of the head elements in which a narrower gap length is desired;
   depositing a second gap layer of insulating material on top of said first gap layer and said barrier layer;
   removing portions of said second gap layer which cover said barrier layer; and
   depositing a second layer of magnetic material on top of said second gap layer and said barrier layer, and patterning said second magnetic layer to form a plurality of top poles.

2. The method of claim 1 wherein said barrier layer comprises a layer of magnetic material.

3. The method of claim 1 wherein said plurality of head elements perform at least two different functions, and said barrier layer is only deposited over the head elements which perform one of the functions.

4. The method of claim 3 wherein the magnetic head comprises a servo writer having at least one timing pattern write element, at least one timing pattern read element, and at least one servo write element, and the barrier layer is deposited over a combination of timing pattern read and write elements and the servo write elements.

* * * * *